United States Patent

Tooru et al.

Patent Number: 5,320,577
Date of Patent: Jun. 14, 1994

[54] AIR CONDITIONER CONTROL DEVICE

[75] Inventors: Nomura Tooru; Ueno Hironobu, both of Osaka; Murayama Hidemi, Higashimachi, all of Japan

[73] Assignee: Figaro Engineering Inc., Osaka, Japan

[21] Appl. No.: 35,250

[22] Filed: Mar. 22, 1993

[51] Int. Cl.$^5$ ............................................. B60H 1/26
[52] U.S. Cl. ....................................... 454/75; 454/139
[58] Field of Search ..................... 364/166; 307/517; 454/25, 139

[56] References Cited

U.S. PATENT DOCUMENTS

| | | | |
|---|---|---|---|
| 4,437,391 | 3/1984 | Eguchi et al. | 454/75 |
| 4,458,583 | 7/1984 | Fukui et al. | 454/75 |
| 4,478,049 | 10/1984 | Fukui et al. | 454/75 |
| 4,733,605 | 3/1988 | Hölter et al. | 454/75 |
| 4,992,965 | 2/1991 | Hölter et al. | 454/75 X |
| 5,062,065 | 10/1991 | Lampe | 454/75 X |

OTHER PUBLICATIONS

3-103,761, Apr. 1991, Japan, English Abstract.
4-65,662, Mar. 1992, Japan, English Abstract.

*Primary Examiner*—Harold Joyce
*Attorney, Agent, or Firm*—Nikaido, Marmelstein, Murray & Oram

[57] ABSTRACT

In an air conditioner control device, edges of change of the sensor outputs are detected by the second derivative of the outputs of WO3 gas sensor for NOx detection. The edge represents that the sensor is exposed to diesel exhaust. Its response to diesel exhaust is quick and it does not affected much by the influence of the wind. When the edge is detected, an intake of an automobile ventilator is dosed and the inflow of contaminated outdoor air is interrupted. An AD convertor stored micro computer is used for processing the sensor signal. In order to compensate the shortage of resolution of the AD convertor, the outputs are first differentiated analogically, then amplified and converted to digital signals, and finally further differentiated digitally.

9 Claims, 12 Drawing Sheets

FIG. 4(A) FIRST DIFFERENTIAL

FIG. 4(B) SECOND DIFFERENTIAL

AIR CONDITIONER CONTROL DEVICE

FIELD OF THE INVENTION

The present invention relates to an air conditioner control device with a gas sensor or a plurality of gas sensors and more particularly to such control device for an automobile ventilator and an automobile air cleaner.

PRIOR ART

It is widely known to use gas sensors in controlling automobile ventilators, in which NOx exhaust from diesel cars is the object of detection in most cases. The applicant has previously proposed an NOx sensor using Pb-pc (lead-phthalocyanine) (Unexamined Patent Hei3-103, 761) and an NOx sensor using WO3 thin film (Unexamined Patent Hei4-15, 662). While they are designed to improve NOx detectivity of the sensors, the NOx detectivity is not sufficient yet and the S/N ratio for noises such as the wind is still inadequate.

Another application of the air conditioner control devices with gas sensors is air cleaner control. In air cleaner control, prompt detection of air contamination caused by smoking is essential. Thus, the sensors are required to detect smoking by a slight change of the sensor output. However, the S/N ratio is too low to detect such a slight change. The noises here include air current variations, fluctuations of electric power caused by ON/OFF of the air cleaners, and changes in humidity. The air cleaners are mostly used in automobiles to clean the indoor air contaminated by smoking. In this case, change of the air current by opening or closing windows or change of the sensor output caused by vapor or body odor of driver and/or passengers also generates noises. The change of the air current includes change in humidity caused by a great deal of inflow of wet air on rainy days as well as change in sensor temperature caused by the wind. Vapor or body odor from driver and/or passengers is also serious problem in detecting air contamination of a limited space of an automobile.

In regard to the prior arts, it is widely known to differentiate an output of a gas sensor analogically or digitally and control air conditioner by the change of output (for example, U.S. Pat. No. 4,458,583). However, in many cases, the first differential of the sensor output alone can not generate sufficient S/N ratio, and thus only the detecting signals with much noises and slow detectivity can be obtained.

SUMMARY OF THE INVENTION

An object of the present invention is to detect the atmospheric contamination promptly with high S/N ratio.

The present invention relates to an improved air conditioner control device which detects the atmospheric contamination by gas sensor output. The feature of the present invention is to use the second derivative signal of the gas sensor output for such detection. The air conditioner control device in the present invention may be applied to, for example, an automobile ventilator control and/or an air cleaner control. Preferably a WO3 gas sensor for NOx detection is to be used in order to detect diesel exhaust and to control an automobile ventilator. As NOx detectivity of the WO3 sensor is low, the sensor output should be corrected by being first differentiated analogically, then amplified, and finally further differentiated digitally.

EMBODIMENT 1

Figure 1:
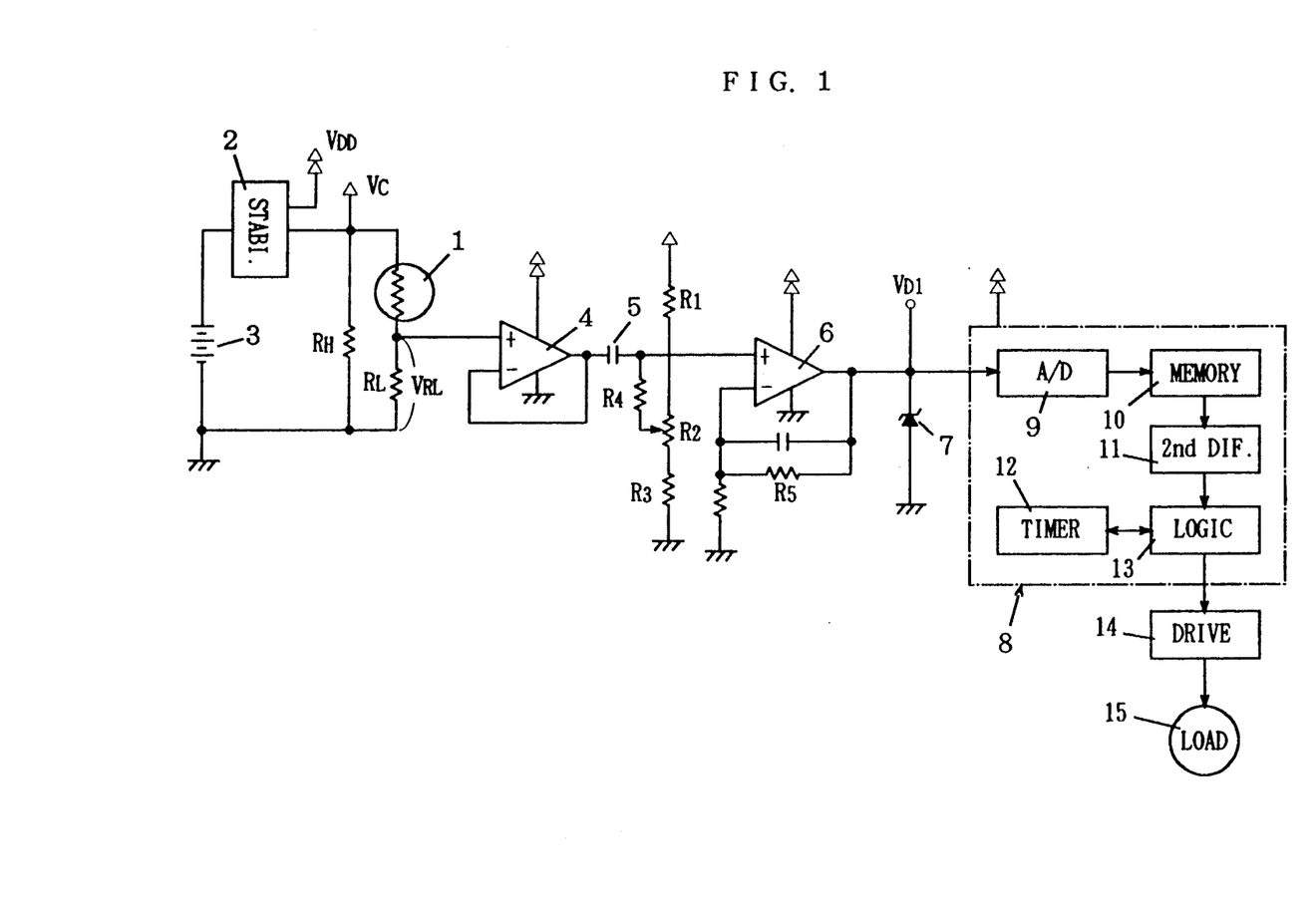
FIG. 1 is a circuit diagram of the automobile ventilator control device of the embodiment.

FIGS. 1 through 6 show the first embodiment. 1 in FIG. 1 is a gas sensor using WO3 metal-oxide semiconductor. RL is a load resistance and RH is a heater. An NOx sensor of, for example, Pb-pc or other gas sensor of, for example, SnO2 may also be applied to the gas sensor 1. 2 is a stabilizing supply which provides two different constant voltage outputs; one for a power supply VC of, for example, 5 V to operate the sensor 1, and the other is for a power supply VDD of, for example, 7 V to operate an incidental circuit. 3 is a power supply, for example, a battery of an automobile. 4 is an operational amplifier for buffer. 5 is a condenser for differential. R1 through R5 are resistances. 6 is an operational amplifier. 7 is a Zener diode for safeguard. 8 is a micro computer. 9 is an AD convertor. 10 is a memory. 11 is a digital differentiator for the second differential. 12 is a timer. 13 is an arithmetic and logic unit. The output of the micro computer 8 is connected to a drive circuit 14 which controls a load 15, for example, a damper of automobile ventilator control device.

Figure 2:
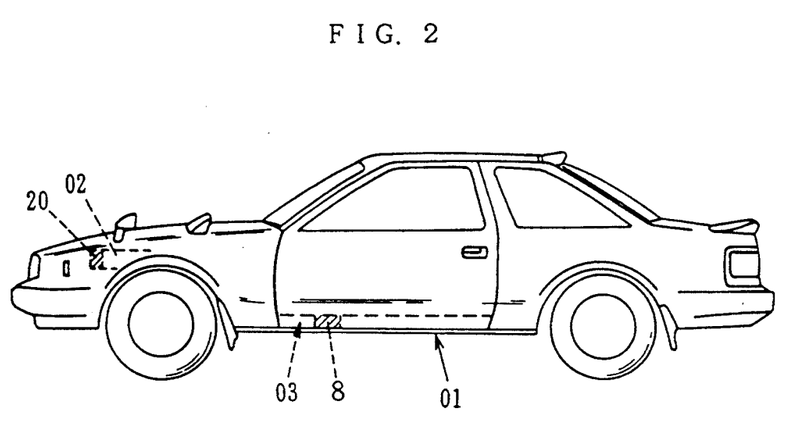
FIG. 2 illustrates the positions of installation of the ventilator control device.

Now, the installation positions of the ventilator control device will be described with reference to FIG. 2. The sensor 1 through the operational amplifier 6 are embedded in a substrate 20 which is to be installed, for example, in front of a radiator grille 02 of an automobile 01. The Zener diode 7 and the micro computer 8 are installed, for example, under a floor panel 03 or in an instrument panel. The sensor 1 should be installed in the radiator grille 02 or dose to windshield wipers because the sensor 1 needs to be exposed to the outdoor air as quick as possible. As the WO3 sensor 1 has high impedance, its signal line is liable to pick up the engine noise. Thus, the line noise should be avoided by installing the buffer amplifier 4 dose to the sensor 1 and shortening the wiring between them. The micro computer 8 should be installed close to an interior chamber of the automobile because it is liable to malfunction due to heat or noise from the engine when it is installed dose to the radiator grille 02. Thus, it is to be installed separately from the sensor 1 and the drive circuits such as the buffer amplifier 4. Therefore, the sensor 1 and at least the buffer amplifier 4 should be installed in the front part of the automobile (for example, in front of the radiator grille 02) and the micro computer 8 should be installed dose to the interior chamber (of the automobile (for example, under the floor panel 03).

Figures 3A, 3B:
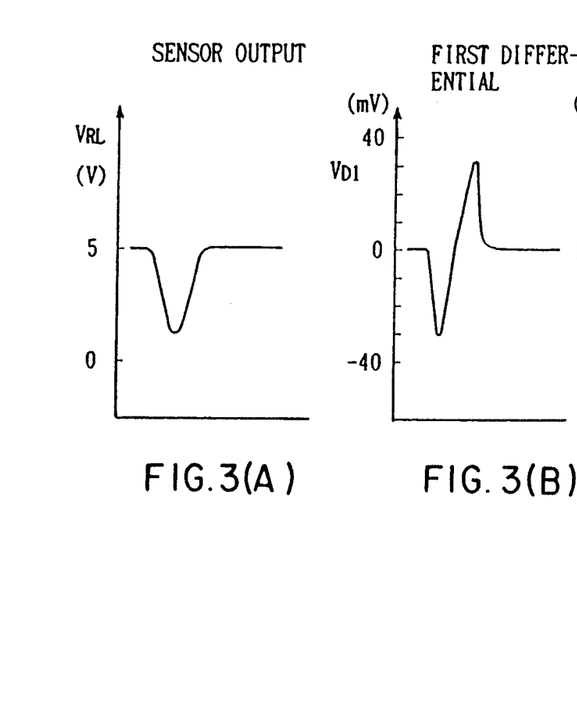
FIG. 3 is an operating waveform diagram of the control device shown in FIG. 1.
Figure 3C:
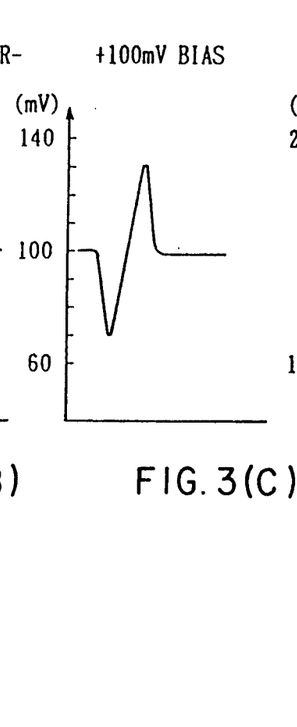
Figure 3D:
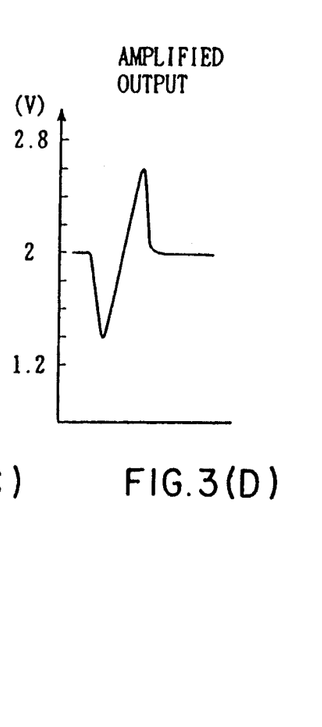

In the following, the operation of the embodiment will be explained with reference to FIG. 3. Both the WO3 sensor 1 for NOx and a Pb-pc sensor for NOx bear quite high resistance. Therefore the load resistance RL needs to have a large capacity of, for example, 1M to 10M Ω. The sensor output is taken out from the load resistance RL through the buyer amplifier 4 and then differentiated analogically by the condenser 5. This first derivative is adjusted by adding a positive bias of, for example, 100 mV through the resistances R2 and R3 in order to operate the operational amplifier 6 by positive range of the power supply VDD. The operational amplifier 6 amplifies the first analog derivative by, for example, 20 times. This output is named the analog derivative VD1. Preparing for the case in which the analog derivative VD1 exceeds the conversion range of the AD convertor 9, the Zener diode 7 is equipped as a safeguard. It is also used to avoid the engine noise.

The problem here is that the NOx density to be detected is rather low and that change of the output VRL from the WO3 sensor 1 for diesel exhaust is only about 50 to 60 mV. If it is converted from analog to digital by 8 bits (AD conversion of 5 V by 8 bits), it will then be only about 2 to 3 bits and is too small for digital differential. In the embodiment, in order to solve this problem, the sensor output is taken out from the load resistance RL of high resistance through the buyer amplifier 4 and differentiated analogically by the condenser 5. Then it is amplified by, for example, 20 times by the operational amplifier 6. Thus, the output of 50 mV can be amplified to, for example, about 1 V.

When the analog derivative VD1 of about 1 V is converted into digital by 8 bits through the AD converter 9, the output of, for example, 50 bits is generated. The memory 10 stores the output one after another and the digital differentiator 11 further differentiates it digitally. The second derivative equals to 0 as long as the sensor output VRL changes linearly, and it becomes larger at an edge of VRL. For this reason, even if the sensor output changes linearly due to the wind or acceleration of the automobile, it does not affect the value of second derivative. Another advantage is that an edge of VRL can be detected by the second derivative. Thus, the detection of the beginning of VRL change is also enabled. Therefore, further quicker detection, than by using only the first derivative, of the overall change of VRL is enabled.

The arithmetic and logic unit 13 detects outdoor air contamination by the second derivative. When the second derivative exceeds a prescribed value, the arithmetic and logic unit 13 doses the load 15 through the drive circuit 14 in order to interrupt the inflow of outdoor air. On the detection of air contamination, the unit 13 starts operating the timer 12 of, for example, 2 minutes. After 2 minutes, at the most, the unit 13 opens the load 15 and resume ventilation. This is to prevent clouding up of windshields, which gives trouble to drivers. If the inflow of outdoor air is interrupted for a longer time than 2 minutes, it may cause clouding up of windshields.

Figures 4A, 4B:
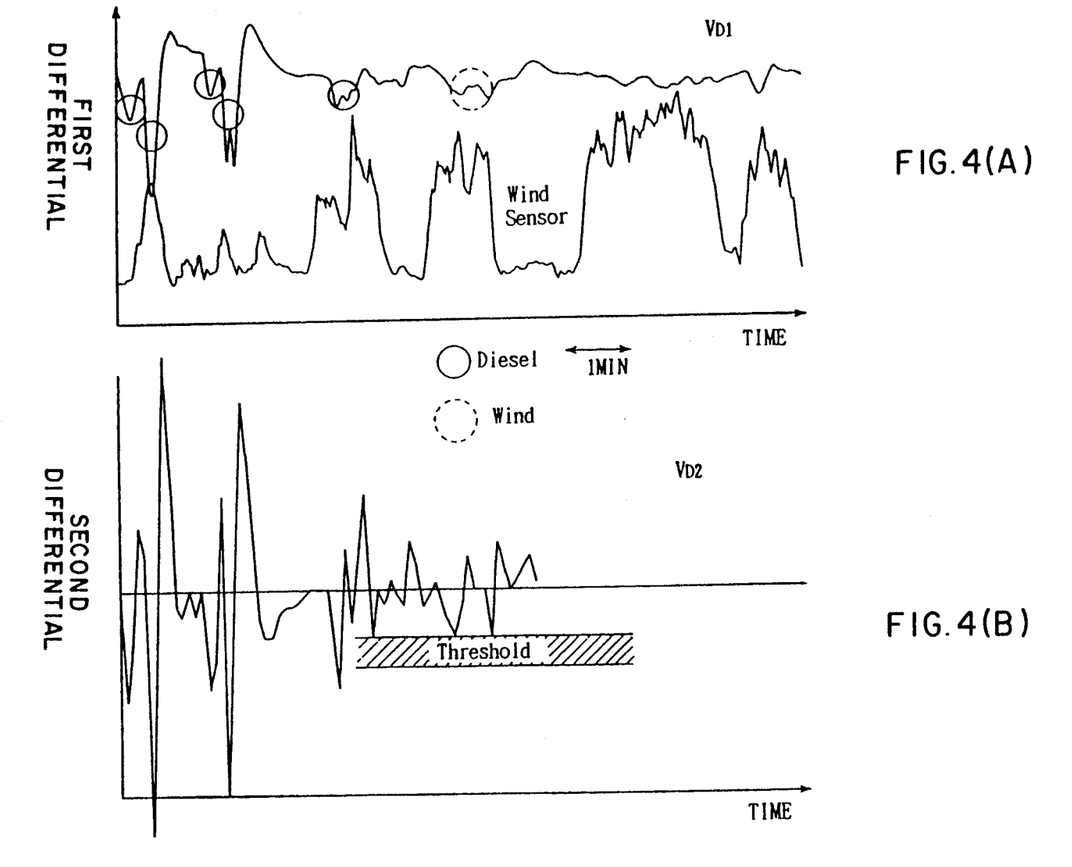
FIG. 4 is a characteristic diagram illustrating the gas sensor output during actual driving of an automobile.

FIG. 4 shows operating characteristics of the embodiment, representing the sensor output of the WO3 sensor 1 during actual driving of the automobile. The upper portion of the figure illustrates the first analog derivative VD1 and output of a wind sensor. The lower portion of the figure illustrates the second digital derivative VD2. In the upper portion of the figure, the circles in solid line represent the outputs for diesel exhaust, while the circle in broken line represents the output for the noise of the wind due to acceleration or deceleration of the automobile. As is clearly shown in the figure, the outputs for diesel exhaust in the first, third and fifth circles are almost identical to that for the wind noise. Therefore, it is difficult to distinguish between the two when only the first analog derivative is taken into consideration. Because the NOx detectivity is low and the noise by the wind is large.

On the other hand, after the second digital differential, the NOx detectivity exceeds the noise of the wind. Consequently, NOx can be distinguished from the wind noise. Thus, only NOx can be detected without being affected by the wind, if a threshold of detection is fixed, for example, as is indicated in the shaded part of the lower portion of FIG. 4. The S/N ratio between NOx and the noise by the wind is improved by using the second digital derivative. Because the change of the sensor output for diesel exhaust is more rapid and remarkable than that for the wind.

Figure 5:
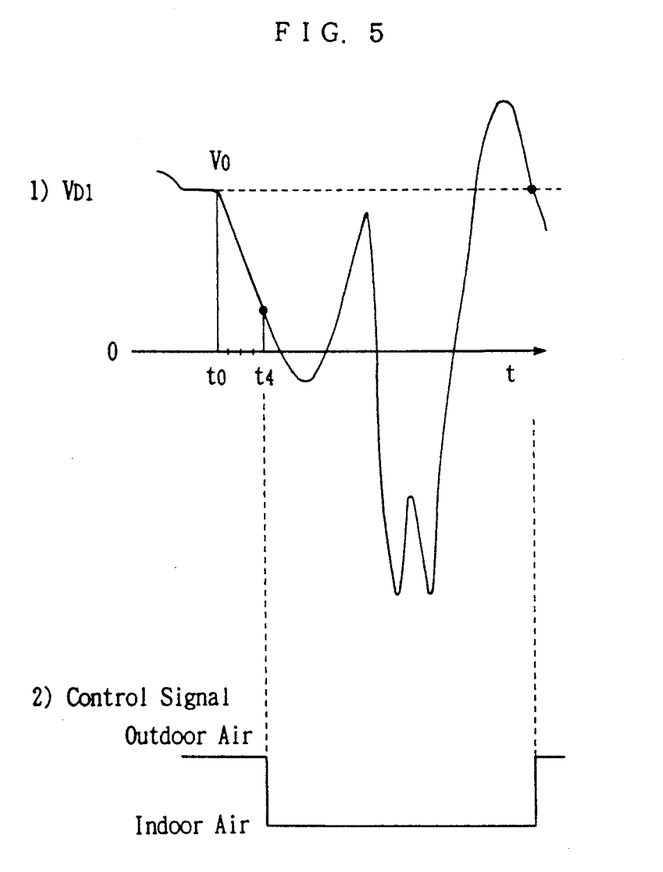
FIG. 5 is a waveform diagram illustrating the operation of the automobile ventilator control device under the gas sensor characteristics shown in FIG. 4.

FIG. 5 shows an operating waveform of the embodiment. This waveform corresponds to the outputs for NOx in the third and forth circles shown in the upper portion of FIG. 4. The analog derivative VD1 is converted into digital, for example, every 1 second and stored in the memory 10. If the sensor 1 is exposed to diesel exhaust at the time t0, the first analog derivative VD1 varies as shown in 1) of FIG. 5. Then, the first analog derivative VD1 is further differentiated digitally by 4 seconds from the time t0 to t4. Using this second derivative VD2, outdoor air contamination is detected at the time t4. It takes 4 seconds to switch from outdoor air to indoor air, because the time constant of the second differential is 4 seconds. Thus, the load 15 (damper) is dosed at the time t4 and the inflow of outdoor air is interrupted.

Once the contamination of outdoor air declines, the analog derivative VD1 shows the peak of output as is shown in the figure. This characteristic is used for the ventilator control of the embodiment. The analog derivative at the time of detection of outdoor air contamination is stored in the memory 10 as a reference level V0. Then, the embodiment detects that the analog derivative VD1 intersects the reference level V0 twice. For example, the analog derivative VD1 intersects the reference level V0 twice in the right upper portion of FIG. 5. It implies that the sensor output VRL has almost recovered to the value before the detection. At this point, accordingly, the load 15 is operated to resume ventilation.

Figure 6:
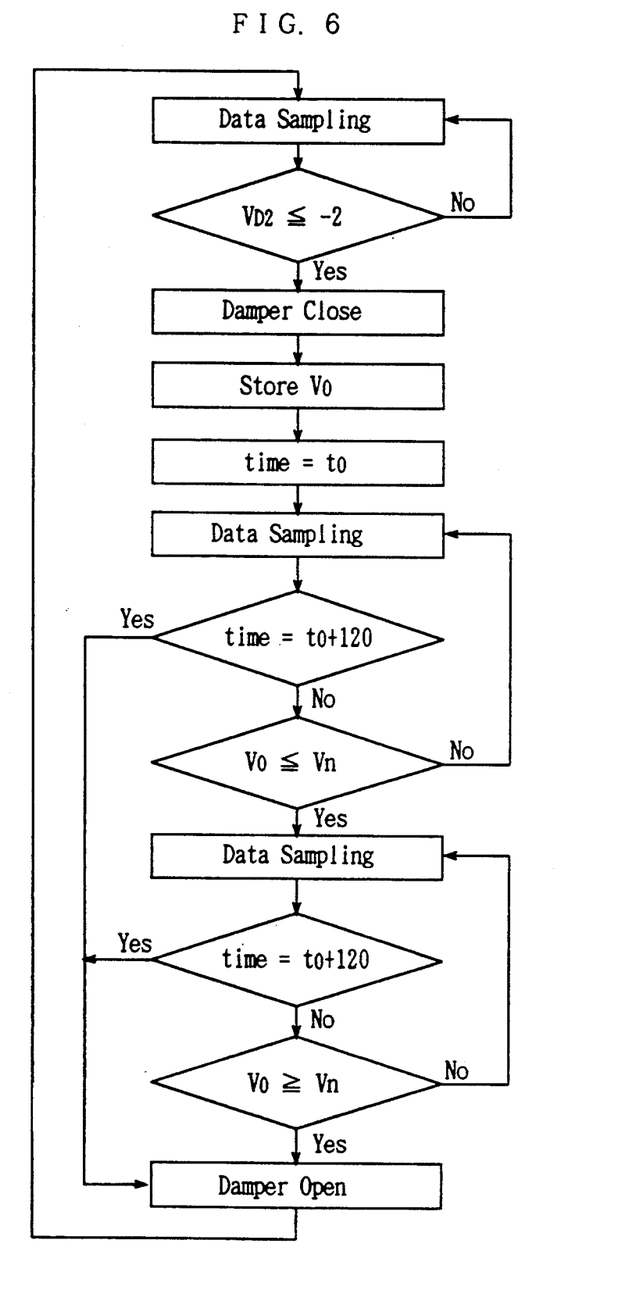
FIG. 6 is an operating flow chart of the automobile ventilator control device of the embodiment.

FIG. 6 is an operating flow chart of the embodiment. The analog derivative VD1 is sampled, for example, every 1 second and differentiated digitally. When the digital derivative VD2 is equal to or less than −2 bits, it is assumed that NOx from diesel cars is detected and the damper 15 is closed. At the same time, the analog derivative V0 at the time t0 in FIG. 5 is stored in the memory 10 and the timer 12 is set. During the following 2 minutes, when the analog derivative VD1 intersects the reference level V0 twice, as is shown in the right portion of FIG. 5, it is assumed that the contamination of outdoor air has declined and the damper 15 is opened. From the results of driving tests, it is found out that there is a possibility that the analog derivative VD1, after the valley shown in FIG. 5, stays in higher area than the reference level V0 and therefore intersects V0 only once. In this case, the damper 15 is opened by the timer 12 after, for example, 2 minutes. The value of 2 minutes is fixed from the results of repeated driving tests so that the percentage of the closing time of the damper 15 might not exceed a specified tolerance and that the windshields might not be clouded up. In this embodiment, the timer 12 compulsorily resumes ventilation. Instead, the reference level V0 may be deemed as, for example, a gradient line which traverses from lower left to upper right in FIG. 5. In other words, the reference level V0 gradually increases as time goes. And eventually, after the damper 15 is being closed for more than a certain time, the analog derivative VD1 intersects the reference level V0 twice and the damper 15 is opened. Although it is not shown in FIG. 6, the sensor 1 also has low detectivity for gasoline exhaust. As for gasoline exhaust from, for example, a motorcycle, the damper 15 is closed when the digital derivative VD2 becomes equal to or more than 5 bits.

Another effective method to reopen the closed damper 15 is to correct the reference level V0 by adding or multiplying an adequate correction factor. When it is confirmed that the analog derivative VD1 intersects this corrected V0 twice, the damper 15 is reopened. The correction factor is not necessarily a constant as long as it satisfies the condition that the percentage of closing time length of the damper 15 is under the maximum limit of the tolerance and that the damper 15 is closed as long as possible when the contamination is frequently detected. Table 1 shows a result of simulation of the damper operation in 30 minutes driving in city area.

TABLE 1

| Correction factors and percentage of the closing time of the damper 15 | |
|---|---|
| Correction Factors | Closing Time Percentage (%) |
| 1.0 | 62 |
| 1.02 | 32 |
| 1.04 | 26 |
| 1.06 | 24 |
| 1.08 | 44 |
| 1.10 | 45 |

*This simulation is based on the data of 30 minutes actual driving. The damper 15 is set to open when VD1 intersects twice the value of V0 that is corrected by being multiplied by a constant factor.

EMBODIMENT 2

Figure 7:
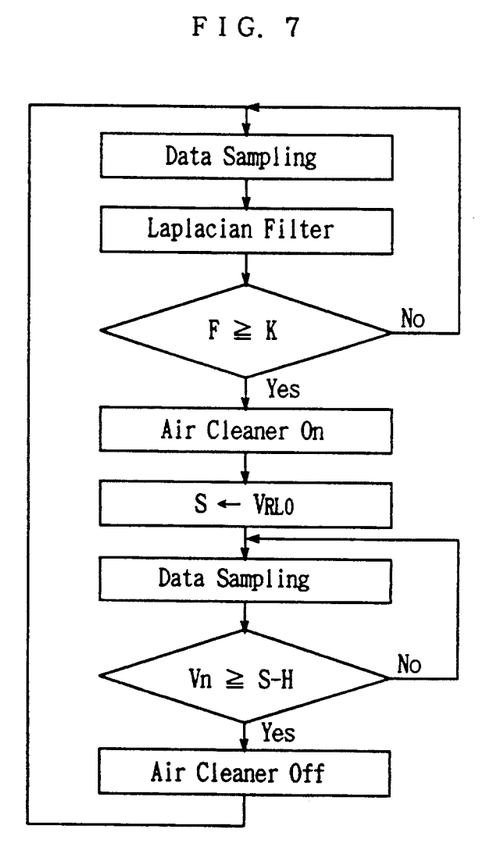
FIG. 7 is an operating flow chart of an air cleaner control device of the embodiment.

FIG. 7 illustrates an operating flow chart of the embodiment which is suitable for an air cleaner control, This embodiment is different from the embodiment shown in FIGS. 1 through 6 on the following points; in this embodiment, a micro computer directly conducts both the first and second digital differentials of the sensor output; and a stop control on an air cleaner is modified. In the embodiment shown in FIG. 7, the output of the sensor 1 is directly processed by a micro computer (similar to the micro computer 8 shown in FIG. 1) which is an implementation of the flow chart shown in FIG. 7. Its configuration is self-evident. In other words, the output is directly digital-differentiated twice. Because, in general, the output of the sensor 1 is large in the case of an air cleaner control and is able to provide a sufficient resolution for both the first and second differentials. In this embodiment, the output of the sensor 1 is sampled, for example, every 1 second and converted from analog to digital. Then through a Laplacian filter, the second digital derivative signal F is calculated. This Laplacian filter is to digitally differentiate the 5 data of the time t0 through t4 twice with the significances (+1, −3, +4, −3, +1), respectively. Thus the second derivative is, for example, ($VRL0 - 3VRL1 + 4VRL2 - 3VRL3 + VRL4$). The bigger the value of n in the symbol VRLn becomes, the more recent the data becomes. A constant of the Laplacian filter is arbitrary. Filters of this kind are generally used as edge filters in the field of image processing. In the embodiment shown in FIG. 7, the second digital derivative F is compared to the constant K. When the second digital derivative F is equal to or more than the constant K, it is assumed that air contamination is detected and the air cleaner is operated. At the same time, the gas sensor output VRL0 is assigned to the reference level S. When the gas sensor output Vn satisfies $Vn \geq S - H$ (H is a positive constant.)

the sensor assumes that air contamination has declined and stops the operation of the air cleaner.

The advantages of detecting edges of the gas sensor output VRL through the edge filter which calculates the second derivative are as follows;

1) As the edge of VRL change is calculable, air contamination can be detected when the rate of VRL change becomes high. Therefore, quicker detection than by the first derivative is enabled.

2) As long as the sensor output increases or decreases linearly, the output of the edge filter equals to 0. Therefore, the detection is not affected by noises such as the wind.

The advantage described in 1) above is clearly shown in the FIGS. 4 and 5. In the figures, the second derivative signal VD2 reaches the maximum before the first derivative signal VD1 becomes the maximum (the bottom of VD1). Moreover, it is obvious that S/N ratio is not decreased even though the detecting speed is accelerated. This is clearly demonstrated in FIG. 4 in which the second derivative signal VD2 reflects the degree of diesel exhaust more accurately than the first derivative signal VD1.

The time constants to the sensor output from air contamination and from noises such as the wind are different. And this difference is crucial as regards the S/N ratio. As the wind noise is rather gradual phenomenon than air contamination, the difference between the two becomes clear in the second derivative. Another noise in detecting outdoor air contamination is the change of sensor temperature caused by acceleration or deceleration of the automobile. The sensor output VRL linearly changes in large scale during acceleration or deceleration because the sensor 1 is equipped in an engine room (in front of the radiator grille 02). As a result, the linear change of the sensor output generates a large noise in the first derivative. However, it does not generate any noise in the second derivative.

EMBODIMENT 3

FIGS. 8 through 14 show the embodiment in which both diesel exhaust and gasoline exhaust are to be detected. This embodiment may be used in an automobile ventilator control. An SnO2 sensor 80 for gasoline exhaust and a signal processor for the sensor are incorporated in the device with the NOx sensor 1 shown in FIG. 1. In the figures and in the following description of the embodiment, the numbers in FIG. 1 represent the same objects.

Figure 8:
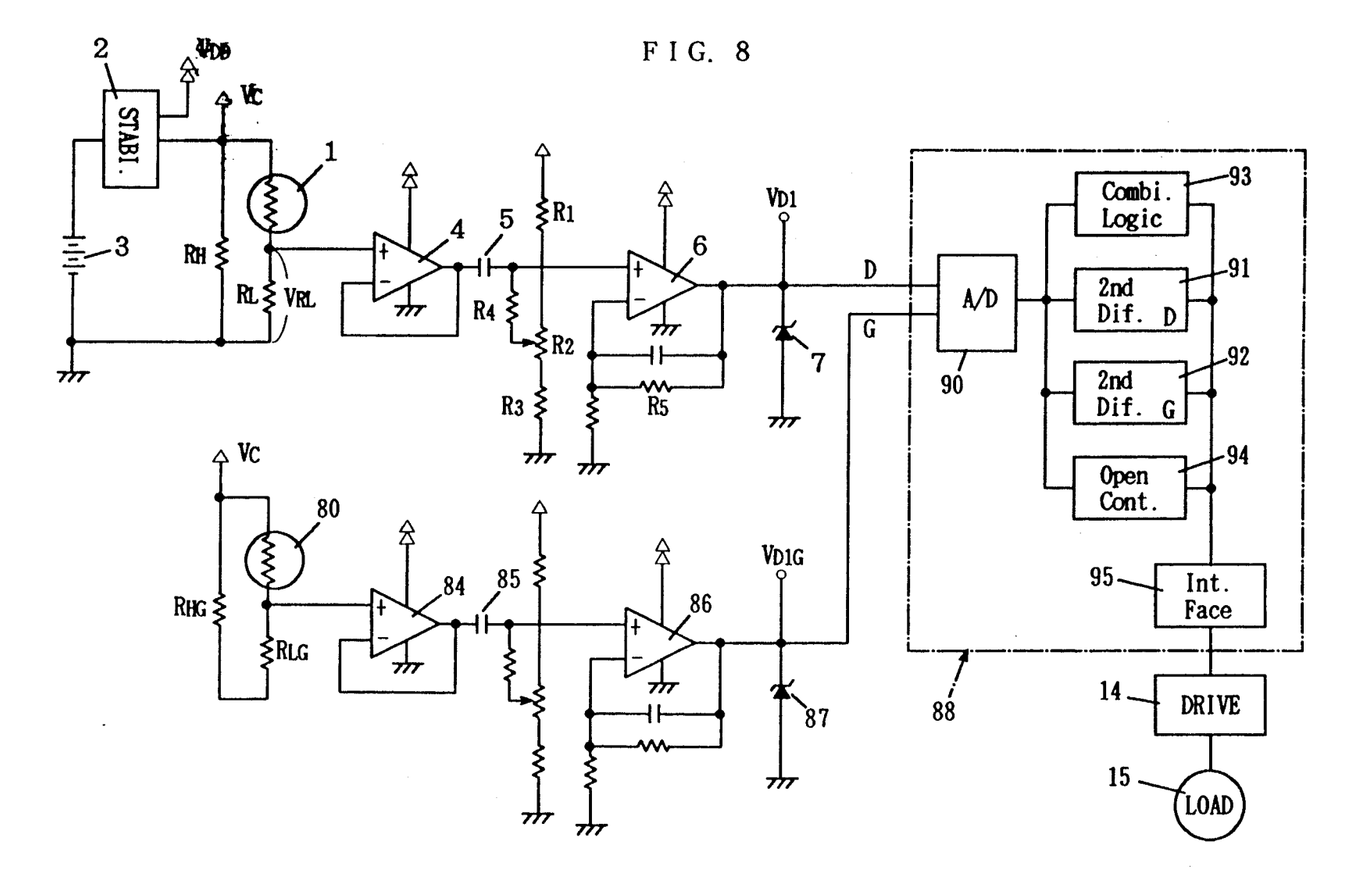
FIG. 8 is a circuit diagram of the embodiment in which a diesel exhaust sensor and a gasoline exhaust sensor are incorporated in order to control an automobile ventilator.

80 in FIG. 8 is an SnO2 gas sensor which detects flammable gas such as CO and HC in gasoline exhaust. 84 is an operational amplifier for buffer. 85 is a differential condenser. 86 is an operational amplifier. 87 is a Zener diode for safeguard. 88 is a new micro computer. 90 is an AD convertor with 2 ports. 91 is a differentiator for the second differential which generates the second derivative signal by further differentiating digitally the analog derivative signal of the output of the WO3 sensor 1. 92 is a second differentiator for the SnO2 sensor 80 which also generates the second derivative signal of the output of the SnO2 sensor 80. 93 is a combinational logic circuit which checks, in order to eliminate maldetection by the wind, the second derivative signal of the SnO2 sensor 80 when diesel exhaust is detected by the second derivative signal of the WO3 sensor 1. 94 is a control circuit to open the load 15 (damper). 95 is an interface which processes the signals from the second differentiators 91 and 92, the combinational logic circuit 93, and the control circuit 94 in order to control the drive circuit 14. In this embodiment, the symbol D represents the signals from WO3 sensor 1, while the symbol G represents the signals from SnO2 sensor 80.

In the embodiment shown in FIG. 8, like in the first embodiment, the sensors 1 and 80 via the buffer amplifiers 4 and 84 to the operational amplifiers 6 and 86 should be installed, for example, in front of the radiator grille 02. The Zener diodes 7 and 87 and the micro computer 88 should be installed under the floor panel 03.

Figure 9:
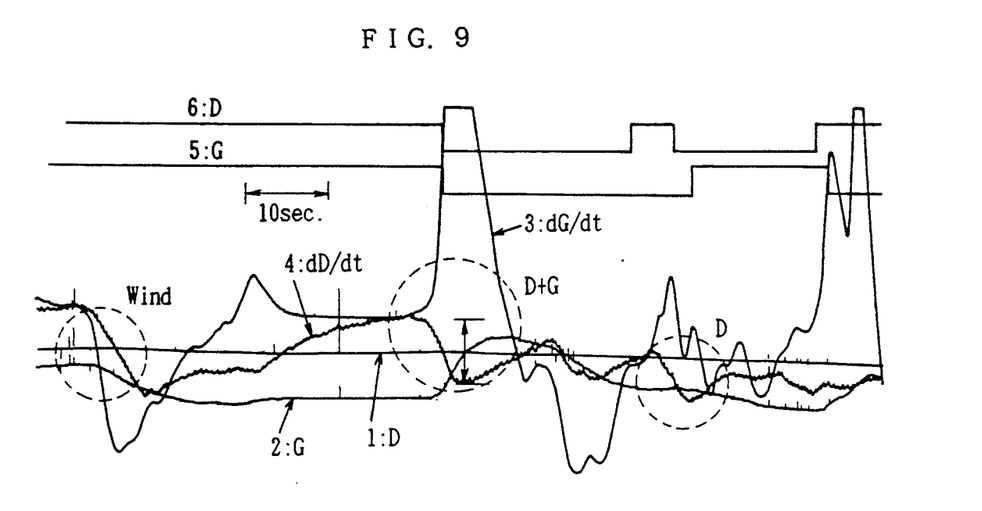
FIG. 9 is a characteristic diagram illustrating the output of the embodiment shown in FIG. 8 during actual driving of an automobile.
Figure 10:
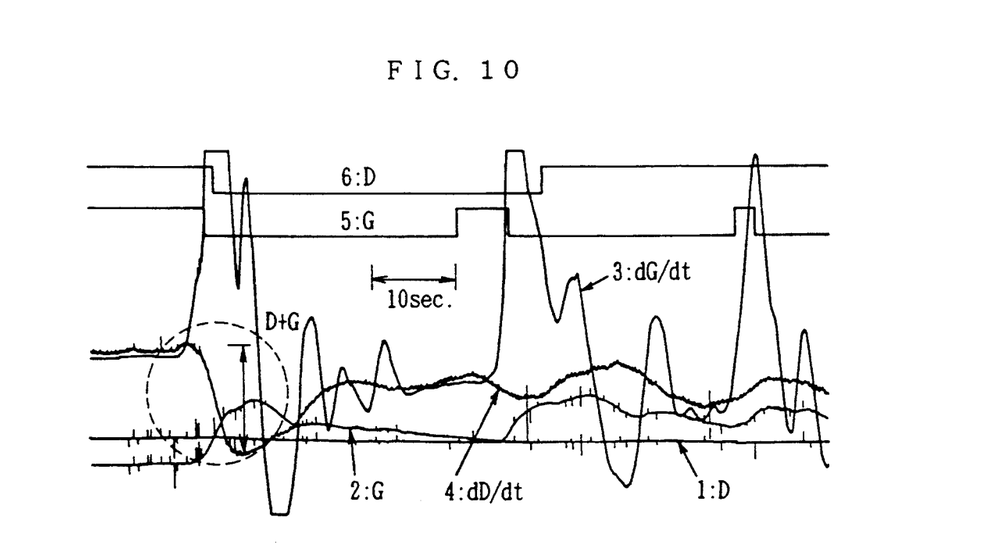
FIG. 10 is a characteristic diagram illustrating the output of the embodiment shown in FIG. 8 during actual driving of an automobile.
Figure 11:
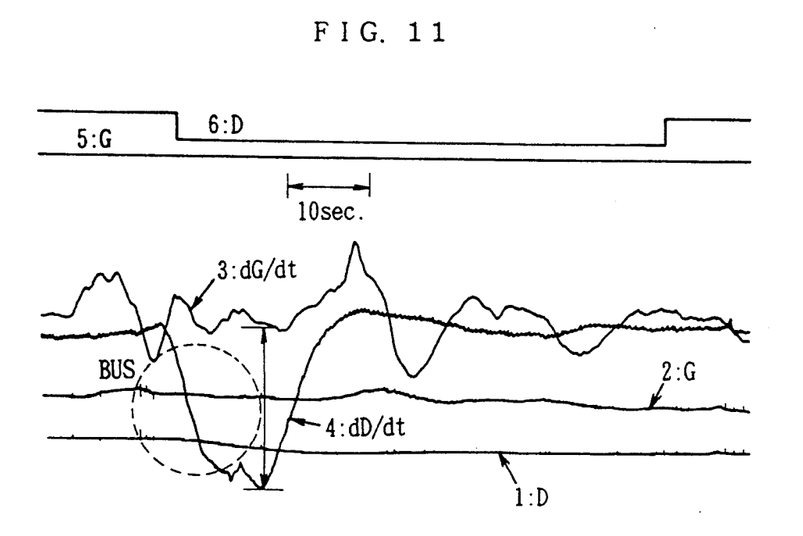
FIG. 11 is a characteristic diagram illustrating the output of the embodiment shown in FIG. 8 during actual driving of an automobile.

FIGS. 9 through 11 show operating characteristics of the diesel sensor 1 and the gasoline sensor 80 during actual driving of the automobile. Curve 1 in the figure represents the output of the diesel sensor 1, curve 2 represents the output of the gasoline sensor 80, curve 3 represents the first derivative signal dG/dt of the gasoline sensor, and curve 4 represents the first derivative signal dD/dt of the diesel sensor. A control signal 5, shown in the upper portion of the figure, represents the control signal from the gasoline sensor to the damper 15 and a control signal 6 represents the control signal from the diesel sensor to the damper 15. LOW side of the control signal is a close signal for the damper 15.

In the left portion of FIG. 9, noise of the wind to the diesel sensor 1 is recognized. In this case, while the second derivative signal of the diesel sensor 1 satisfies the condition to detect diesel exhaust, the second derivative signal of the gasoline sensor 80 shows a large negative value. Both the second derivative signals from the sensors 1 and 80 become large negative values not because of diesel exhaust but of cooling down of the sensors 1 and 80 due to the wind. Thus, when the second derivative signal of the gasoline sensor 80 shows a large negative value, the second derivative signal of the diesel sensor 1 is nullified.

In the center portion of FIG. 9, response waveforms are recognized to both diesel exhaust and gasoline exhaust. In the embodiment, gasoline exhaust and diesel exhaust are detected separately. While diesel exhaust is detected by the gradient of curve 4 (dD/dt), gasoline exhaust is detected by the gradient of curve 3 (dG/dt). In other words, the second derivatives of the sensors 1 and 80 are used to detect diesel and gasoline exhaust, respectively. The time length in which the damper 15 is being closed is to be proportionated to a depth of the dD/dt valley for diesel exhaust, and to a height of the dG/dt peak (height from the foot of the peak to the peak) for gasoline exhaust. For example, a small detecting signal for diesel exhaust is recognized in the right portion of FIG. 9. However, as the valley is shallow, the time length of dosing the damper 15 is short. On the other hand, the damper 15 is dosed for a longer time by the detecting signal for diesel exhaust, shown in the center of FIG. 9, which forms a deep valley.

FIG. 10 shows other data measured on the same day. Two detecting signals for diesel and gasoline exhaust are recognized in the left portion of the figure. The density of diesel exhaust is high and the valley of dD/dt is deep. Thus, the damper 15 is dosed for a longer time according to the depth of the valley.

FIG. 11 illustrates response waveforms of the sensors to high density diesel exhaust from a bus. The valley of dD/dt is very deep. Accordingly, the damper 15 is dosed for a longer time which corresponds to the depth of the valley.

Figure 12:
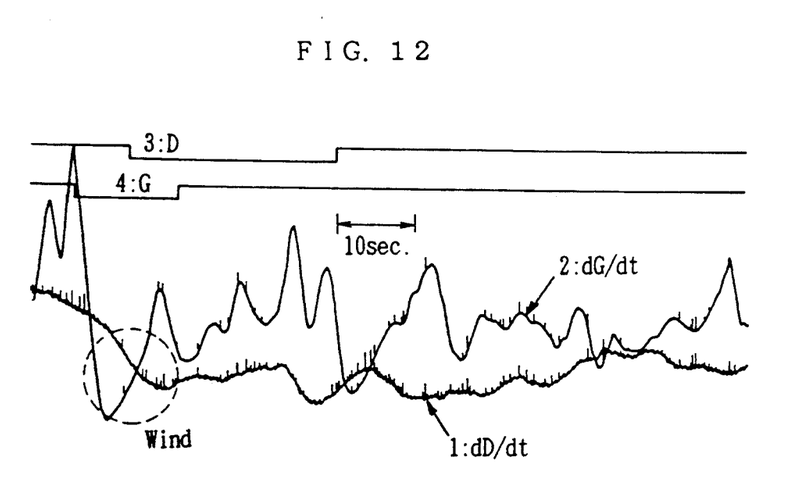
FIG. 12 is a characteristic diagram illustrating the output of the embodiment shown in FIG. 8 during actual driving of an automobile.

When the second derivative signal of the diesel sensor 1 indicates the existence of diesel exhaust, the second derivative signal of the gasoline sensor 80 is checked. By this method, approximately 50% of the noise such as the wind can be eliminated. However other 50% of the noise still remains. FIG. 12 shows an example of the noise. The data of FIG. 12 were measured on a different day than those of FIGS. 9 through 11. Curve 1 in the figure represents the first derivative signal dD/dt of the diesel sensor 1. Curve 2 represents the first derivative signal dG/dt of the gasoline sensor 80. A control signal 3 is the control signal from the diesel sensor 1. A control signal 4 is the control signal from the gasoline sensor 80. A detecting signal for diesel exhaust shown in the left portion of FIG. 12 is generated not by the diesel exhaust but by the wind noise. However, the value of $d^2G/dt^2$ at this time is positive and thus the noise can not be eliminated even with the second derivative signal of the gasoline sensor 80. As a result, the damper 15 is dosed. But the dosing time of the damper 15 is very short because the valley of dD/dt is shallow.

Figure 13:
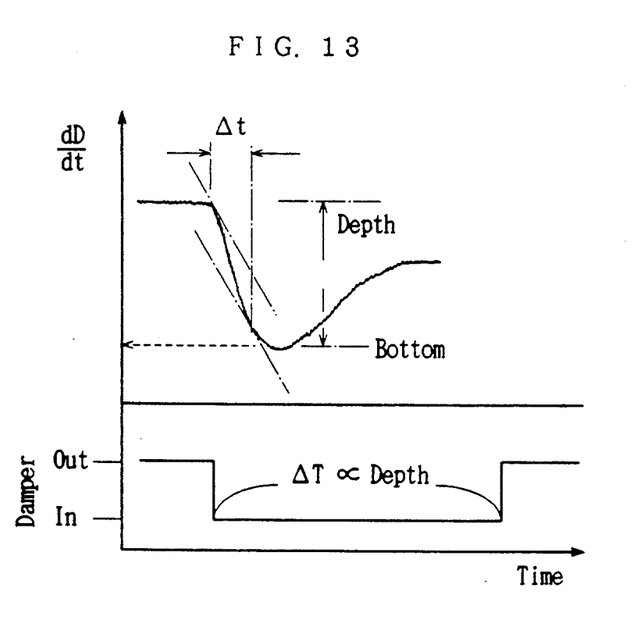
FIG. 13 is a characteristic diagram illustrating a method to determine the length of closing time of a damper of the embodiment shown in FIG. 8.

FIG. 13 illustrates a method to determine a time length of closing the damper 15 by the waveform of dD/dt. When the sensor is exposed to diesel exhaust, dD/dt forms a valley. And diesel exhaust is detected by the gradient of dD/dt at the beginning of the valley. A depth of the valley, a value of dD/dt at the bottom of the valley, or a width of the valley Δt correlate with the degree of diesel exhaust. Thus, a time length of dosing the damper 15 is determined corresponding to these signals, more specifically, for example, in proportion to these signals. For example, the damper 15 is dosed during the time ΔT which is in proportion to the depth of the valley as is shown in the lower portion of FIG. 13. In order to get a width of the valley Δt, for example, the time length in which $d^2D/dt^2$ is exceeding the threshold (time between the two chain lines in the figure) is counted and is assigned as the width of the valley $\Delta t$.

So far the method to determine a dosing time of the damper 15 is explained in regard to the diesel sensor 1. The same method can be applied to the gasoline sensor 80. As for the gasoline sensor 80, $dG/dt$ becomes the peak when the sensor 80 is exposed to gasoline exhaust. The time length of dosing the damper 15 is determined by a height of the peak, a value of $dG/dt$ at the peak, or a width of the peak.

Figure 14:
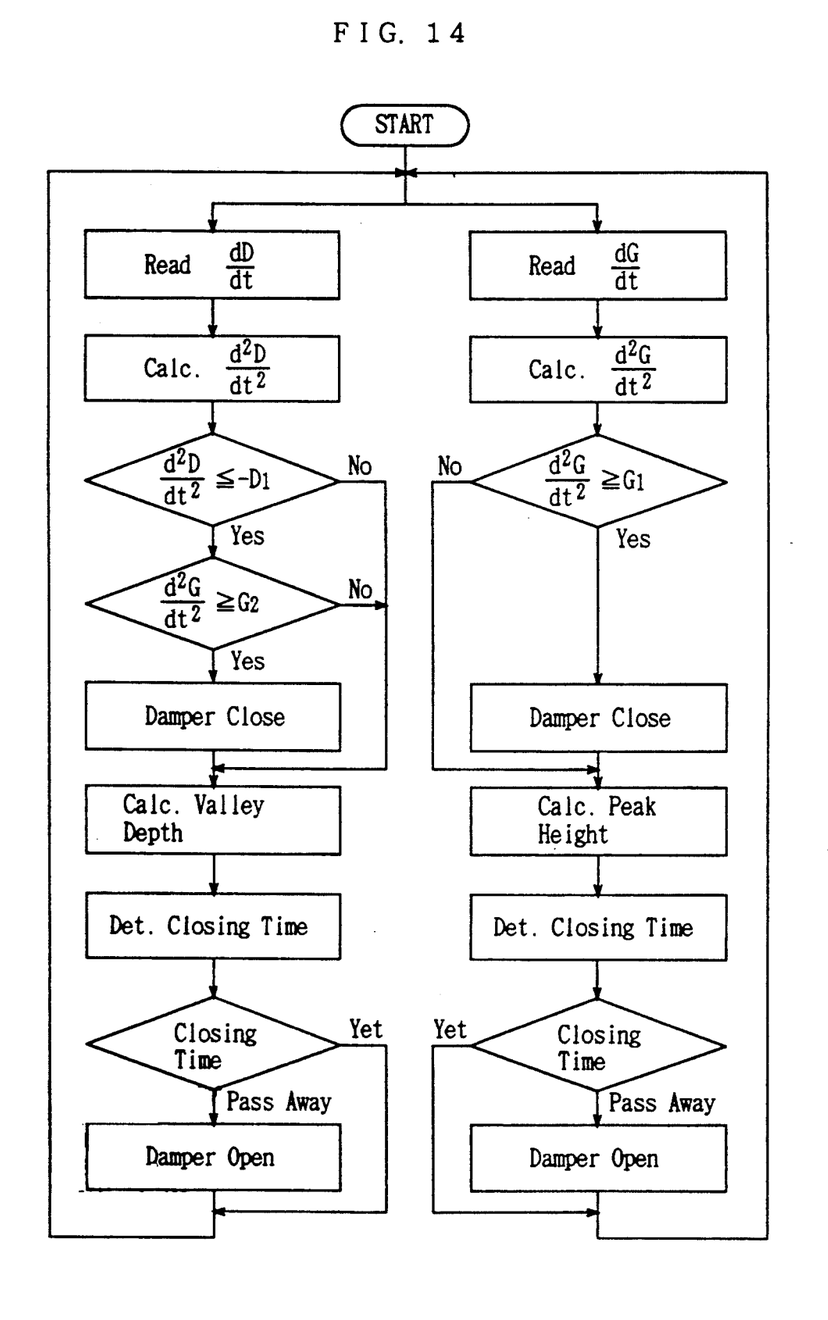
FIG. 14 is an operating flow chart of the embodiment shown in FIG. 8.

FIG. 14 shows an operating algorithm of the embodiment shown in FIG. 8. This algorithm includes both signal processing of the diesel sensor 1 and the gasoline sensor 80. These two processes are carried out parallel. The first derivative signals of both sensors 1 and 80 are read, for example, every 1 second. In the signal processing of the diesel sensor 1, $d^2D/dt^2$ is calculated by digital differential. When the second derivative signal $d^2D/dt^2$ is equal to or less than the threshold $-D1$, the detection of diesel exhaust is assumed. At the same time, the second derivative signal $d^2G/dt^2$ of the gasoline sensor 80 is checked and if the value of $d^2G/dt^2$ is equal to or less than G2, it is assumed that the detecting signal for diesel exhaust is caused by the wind and the signal is nullified. The threshold G2 is generally a negative value. In order to confirm whether the detecting signal is generated by the wind noise or by diesel exhaust, $dG/dt$, instead of $d^2G/dt^2$, may be referred. If the detection of diesel exhaust is confirmed, the damper 15 is dosed and a depth of the corresponding valley of $dD/dt$ is calculated. The valley bottom is formed generally within 15 seconds after $d^2D/dt^2$ becomes equal to or less than $-D1$. The minimum $dD/dt$ during this period is calculated. The value of $dD/dt$ when $d^2D/dt^2$ becomes equal to or less than $-D1$ is assigned as a reference level of the valley. The difference between the reference level and the minimum $dD/dt$ is the value of the valley depth. The dosing time of the damper 15, therefore, is proportionated to the valley depth, the value of $dD/dt$ at the bottom, or the width of the valley. The damper 15 is reopened after the dosing time.

As for the signal processing of the gasoline sensor 80, the first derivative signal $dG/dt$ is read, for example, every 1 second and further differentiated digitally. When the second digital derivative signal $d^2G/dt^2$ is equal to or more than the threshold G1, it is assumed that gasoline exhaust is detected and the damper 15 is dosed. The gasoline sensor 80 generates the signal of a large amplitude for gasoline exhaust and is not largely affected by the wind. Thus, in the signal processing of the gasoline sensor 80, it is not necessary to refer to the signal of the diesel sensor 1. When gasoline exhaust is detected, a height of the peak of $dG/dt$ is calculated and the damper 15 is dosed during the time in proportion to the peak height. In FIGS. 9 and 10, $dG/dt$ often overflows. Therefore, a time length in which $dG/dt$ is being equal to or more than a prescribed value may be applied instead of a peak height. In this case, a value of time length, which is equal to a peak width, is calculated. Although there is a problem of overflow, a value of $dG/dt$ at the peak may be calculated and applied for this purpose. By the above mentioned methods, a dosing time of the damper 15 is determined. And the damper 15 is reopened after the determined time.

We claim:

1. An air conditioner control device for detecting atmospheric contamination and controlling an air conditioner, said air conditioner control device comprising,
   a gas sensor providing an output which changes according to atmospheric contamination,
   means for producing an edge-based digital derivative signal of the gas sensor output,
   means for detecting atmospheric contamination based upon the edge-based digital derivative signal and for outputting a contamination signal, and
   means for controlling the air conditioner based upon the contamination signal.

2. An air conditioner control device as set forth in claim 1, wherein said differentiating means comprises,
   means for analogically differentiating the output of the gas sensor and amplifying the analogically differentiated output into an analog derivative signal,
   an AD converter for converting the analog derivative signal into a slope-based digital derivative signal, and
   means for digitally differentiating the slope-based digital derivative signal into the edge-based digital derivative signal.

3. An air conditioner control device as set forth in claim 2 further comprising,
   means for storing the slope digital derivative signal when the contamination signal is outputted, and
   means for releasing the contamination signal when the slope digital derivative signal intersects said stored signal twice after the contamination signal is outputted.

4. An air conditioner control device as set forth in claim 2 further comprising,
   means for detecting the amplitude of the slope digital derivative signal caused by atmospheric contamination by the comparison of the slope digital derivative signal before and after the contamination signal is outputted.

5. An air conditioner control device as set forth in claim 1, wherein said gas sensor is an NOx gas sensor, and said means for detecting atmospheric contamination comprises means for detecting diesel exhaust and for outputting a diesel exhaust detection signal, and said means for controlling the air conditioner is means for controlling an automobile ventilator.

6. An air conditioner control device as set forth in claim 1 further comprising,
   an AD convertor for converting the output of the gas sensor into a digital sensor output, and
   a Laplacian filter for differentiating the digital sensor output into the edge-based digital derivative signal.

7. An air conditioner control device as set forth in claim 5 wherein,
   said NOx gas sensor is a gas sensor utilizing a variation of resistance of WO3.

8. An air conditioner control device as set forth in claim 7 further comprising,
   a second gas sensor utilizing the variation of the resistance of SnO2 and whose output changes according to gasoline exhaust,
   means for differentiating the SnO2 gas sensor output into the slope-based digital derivative signal of the SnO2 gas sensor output,
   means for differentiating the slope-based digital derivative signal of the SnO2 gas sensor output into the edge-based digital derivative signal of the SnO2 gas sensor output, means for detecting gasoline exhaust and for outputting a gasoline exhaust detection signal by the edge-based digital derivative signal of the SnO2 gas sensor output, and means for controlling the automobile ventilator.

9. An air conditioner control device as set forth in claim 8 wherein, said diesel exhaust detection means further comprising means for confirming at least one of the signals consisting of the edge-based digital derivative signal and the slope-based digital derivative signal of the SnO2 gas sensor output being in a predetermined range and inhibiting the diesel exhaust detection signal when said one of the signals being outside the range.

* * * * *